(12) United States Patent
Chaul, Sr.

(10) Patent No.: US 10,336,171 B2
(45) Date of Patent: Jul. 2, 2019

(54) RETRACTABLE VEHICLE COVER AND ASSOCIATED USE THEREOF

(71) Applicant: Juan C Chaul, Sr., Downey, CA (US)

(72) Inventor: Juan C Chaul, Sr., Downey, CA (US)

( * ) Notice: Subject to any disclaimer, the term of this patent is extended or adjusted under 35 U.S.C. 154(b) by 0 days.

(21) Appl. No.: 15/452,242

(22) Filed: Mar. 7, 2017

(65) Prior Publication Data
US 2017/0259660 A1  Sep. 14, 2017

Related U.S. Application Data

(60) Provisional application No. 62/305,148, filed on Mar. 8, 2016.

(51) Int. Cl.
*B60J 7/20* (2006.01)
*B60J 11/02* (2006.01)

(52) U.S. Cl.
CPC ............. *B60J 11/025* (2013.01); *B60J 11/02* (2013.01)

(58) Field of Classification Search
CPC .... B65D 85/324; B65D 5/546; B65D 85/672; B25C 5/025; B65F 1/1426; B60J 7/145; B60J 7/202; B60J 7/10; B60J 1/1823; Y10S 280/05
USPC .............................................. 296/136.04, 98
See application file for complete search history.

(56) References Cited

U.S. PATENT DOCUMENTS

| 1,999,171 | A | * | 4/1935 | Bryant | B60J 11/02 150/166 |
| 3,050,075 | A | * | 8/1962 | Kaplan | B60J 11/02 135/115 |
| 4,169,658 | A |   | 10/1979 | Brown | |
| 4,727,898 | A | * | 3/1988 | Guma | B60J 11/02 135/87 |
| 4,929,016 | A | * | 5/1990 | Kastanis | B60J 11/02 296/136.03 |
| 5,022,700 | A | * | 6/1991 | Fasiska | B60J 11/02 160/26 |
| 5,230,545 | A | * | 7/1993 | Huang | B60J 11/00 160/370.21 |
| 5,378,035 | A | * | 1/1995 | Wu | B60J 11/02 150/166 |
| 5,423,588 | A | * | 6/1995 | Eglinton | B60J 7/085 224/324 |
| 5,433,499 | A | * | 7/1995 | Wu | B60J 11/02 296/136.02 |
| 5,462,329 | A | * | 10/1995 | Cheng | B60J 11/02 160/24 |
| 5,516,181 | A | * | 5/1996 | Thompson | B60J 11/02 150/166 |
| 5,597,196 | A | * | 1/1997 | Gibbs | B60J 11/02 160/326 |
| 5,762,393 | A | * | 6/1998 | Darmas, Sr. | B60J 11/025 296/136.01 |
| 5,902,003 | A | * | 5/1999 | Hindson | B60J 11/02 293/128 |

(Continued)

*Primary Examiner* — Kiran B Patel

(74) *Attorney, Agent, or Firm* — Averill & Green; Kenneth L. Green

(57) ABSTRACT

A roof mounted retractable car cover. The cover includes front and rear cover portions independently extended and retracted into a housing. The housing preferably includes a springed retractions mechanism and the front and/or rear portions include folded panels to cover side windows of a vehicle. The housing may be integrated into a roof rack to utilized a single mounting system.

3 Claims, 4 Drawing Sheets

(56) References Cited

U.S. PATENT DOCUMENTS

| | | | | |
|---|---|---|---|---|
| 6,012,759 A * | 1/2000 | Adamek | ............... | B60J 11/02 |
| | | | | 296/136.03 |
| 6,206,451 B1 * | 3/2001 | Maano | ............... | B60J 11/00 |
| | | | | 296/136.04 |
| 6,276,381 B1 * | 8/2001 | O'Brien | ............... | B60J 11/02 |
| | | | | 135/115 |
| 6,412,851 B1 * | 7/2002 | Burks | ............... | B60J 11/02 |
| | | | | 160/370.22 |
| 6,513,858 B1 * | 2/2003 | Li | ............... | B60J 11/02 |
| | | | | 150/166 |
| 6,672,643 B1 * | 1/2004 | Brodskiy | ............... | B60J 11/02 |
| | | | | 296/136.01 |
| 6,908,138 B2 * | 6/2005 | Yang | ............... | B60J 11/025 |
| | | | | 135/88.1 |
| 6,935,674 B1 * | 8/2005 | Campos | ............... | B60J 11/00 |
| | | | | 296/136.1 |
| 6,964,446 B2 * | 11/2005 | Porter | ............... | B60J 11/02 |
| | | | | 150/166 |
| 6,997,497 B2 * | 2/2006 | Sagi | ............... | B60R 9/055 |
| | | | | 224/309 |
| 7,137,661 B2 * | 11/2006 | Neuer | ............... | B60J 11/02 |
| | | | | 296/136.01 |
| 7,464,982 B1 * | 12/2008 | Lin | ............... | B60J 11/02 |
| | | | | 296/136.01 |
| 7,478,862 B2 * | 1/2009 | Wiegel | ............... | B60J 11/02 |
| | | | | 296/98 |
| 7,603,937 B2 * | 10/2009 | Pavlik | ............... | B26D 1/045 |
| | | | | 83/614 |
| 7,967,366 B1 * | 6/2011 | Tellez | ............... | B60J 11/02 |
| | | | | 296/136.02 |
| 8,684,444 B2 * | 4/2014 | Dao | ............... | B60J 11/04 |
| | | | | 296/136.01 |
| 9,610,834 B2 * | 4/2017 | Joseph | ............... | B60R 19/48 |
| 9,776,465 B2 * | 10/2017 | Merino Almeida | ..... | B60D 1/54 |
| 9,783,034 B2 * | 10/2017 | Yafouz | ............... | B60J 11/02 |
| 9,925,855 B2 * | 3/2018 | Joao | ............... | B60J 11/08 |
| 2004/0238089 A1 * | 12/2004 | Li | ............... | B60J 11/00 |
| | | | | 150/166 |
| 2005/0055886 A1 * | 3/2005 | Sharapov | ............... | B60J 11/02 |
| | | | | 52/3 |
| 2006/0232095 A1 * | 10/2006 | Sedighzadeh | ............... | B60J 11/02 |
| | | | | 296/98 |
| 2009/0288891 A1 * | 11/2009 | Budge | ............... | B60K 16/00 |
| | | | | 180/2.2 |
| 2016/0311298 A1 * | 10/2016 | Tokhy | ............... | B60J 11/02 |

\* cited by examiner

RETRACTABLE VEHICLE COVER AND ASSOCIATED USE THEREOF

CROSS-REFERENCE TO RELATED APPLICATIONS

The present application claims the priority of U.S. Provisional Patent Application Ser. No. 62/305,148 filed Mar. 8, 2016, which application is incorporated in its entirety herein by reference.

BACKGROUND OF THE INVENTION

The present invention relates in particular to car covers and to retractable car covers.

Car covers are commonly used to protect car finishes from the sun, wind, dust, etc. While the benefits of car covers are widely accepted, the difficulty in using these covers has prevented their wide use. Retractable car covers have been introduced to overcome this difficulty, but these also have not been widely accepted due to the difficulty in using them.

U.S. Pat. No. 6,964,446 issued Nov. 15, 2005 describes such retractable cover using a hand crank system. Unfortunately, such hand crank requires the user to wind the cover into a housing while also guiding the cover, which often proved difficult.

BRIEF SUMMARY OF THE INVENTION

The present invention addresses the above and other needs by providing a roof mounted retractable car cover. The cover includes front and rear cover portions independently extended and retracted into a housing. The housing preferably includes a springed retractions mechanism or a powered retraction mechanism, and the front and/or rear portions include folded panels to cover side windows of a vehicle. The housing may be integrated into a roof rack to utilized a single mounting system.

In accordance with one aspect of the invention, there is provided a roof mounted retractable car cover retracted by springs into a housing. The springs are wound when the cover are extended, and lock into the extended position when the covers are fully extended. Pulling on the locked covers releases the locks allowing the springs to draw the covers back into the housing while the user guides the covers.

In accordance with another aspect of the invention, there is provided a roof mounted retractable car cover retracted by a motor. One or more motors reside in the housing. A remote control allows a user to guide the covers back into the housing while operating the motor. The motors may be laterally offset forward and rearward to overlap with cover rollers.

In accordance with yet another aspect of the invention, there is provided a roof mounted retractable car cover having folded side panels. After withdrawing the covers from the housing, the side panels are folded to the sides to cover the side windows of a vehicle. The side cover do not substantially cover portions of the vehicle below the windows, and thus does not add substantial material to the covers and does not substantially reach ahead, behind, or below the side windows, but may somewhat extend ahead, behind, or below the side windows do to differences in vehicle fits and manufacturing tolerances. The side panels are later folded back onto the horizontal portions of the covers, and the covers are then retracted back into the housing. Such side panels protect a vehicle interior from harmful sun rays, and from view.

In accordance with still another aspect of the invention, there is provided a roof mounted retractable car cover integrated into a roof rack. Some vehicle owners object to the appearance of a car cover housing mounted to a vehicle roof, but also desire to have a roof rack to utility. Integrating the car cover housing into the roof rack both removes any need for additional mounting features, and conceals the housing as a portion of the roof rack.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
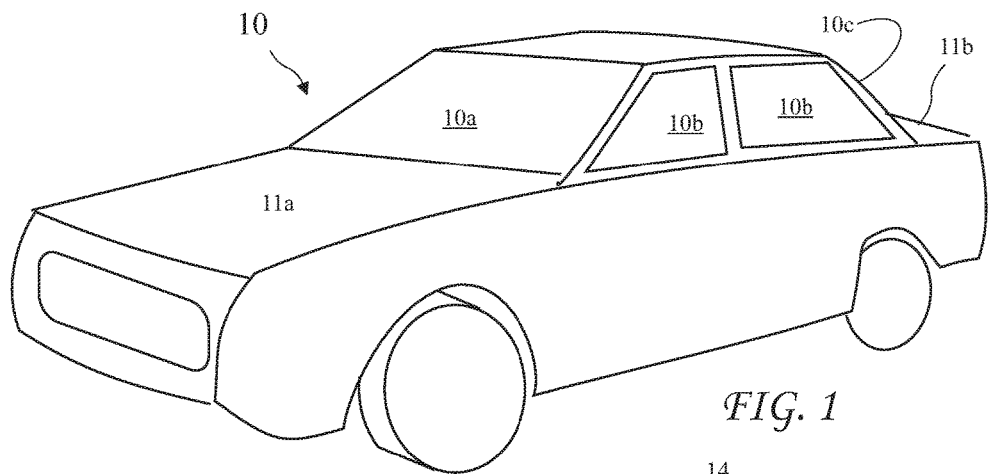
FIG. 1 shows a vehicle without a retractable cover according to the present invention.
Figure 2:
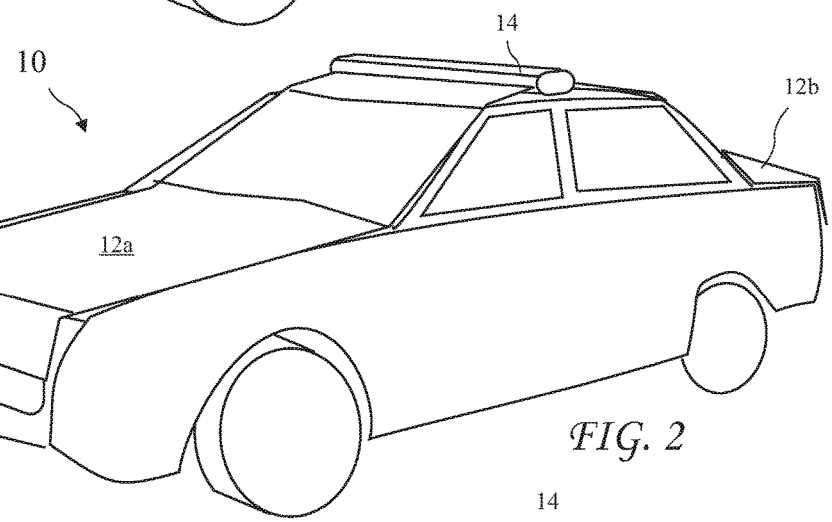
FIG. 2 shows the vehicle with a retractable cover according to the present invention deployed to cover the vehicle windshield, rear window, roof, hood, and trunk lid.
Figure 3:
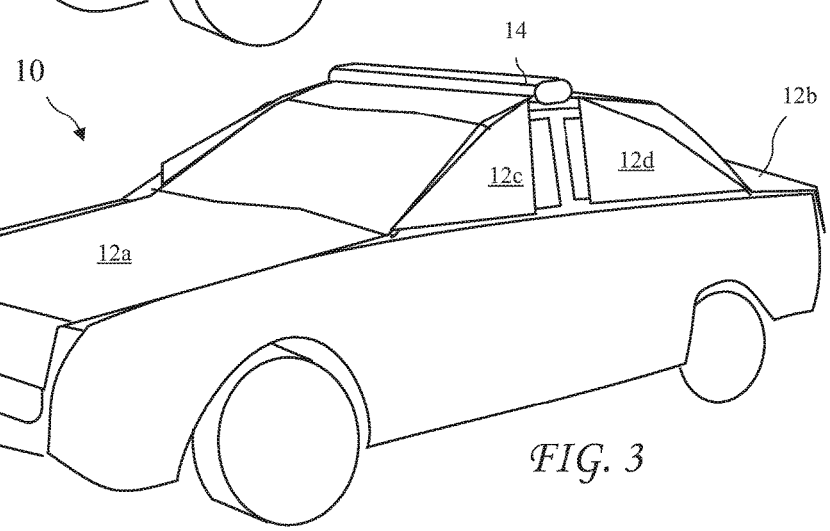
FIG. 3 shows the vehicle with the retractable cover according to the present invention deployed to cover the vehicle windshield, rear window, side windows, roof, hood, and trunk lid.

A vehicle 10 without a retractable cover according to the present invention is shown in FIG. 1, the vehicle with a retractable cover 12 (see FIGS. 4A and 4B) deployed to cover the vehicle 10 windshield 10a, rear window 10c, roof, hood, and trunk lid is shown in FIG. 2, and the vehicle 10 with the retractable cover 12 deployed to cover the vehicle windshield 10a, rear window 10c, side windows 10b, roof, hood, and trunk lid is shown in FIG. 3. The cover 12 includes a front portion 12a configured to cover the hood 10a and a rear portion 12b configured to cover the trunk lid 11b. The front portion 12a and rear portion 12b are preferable deployed from a common housing 14. In one embodiment the front and/or rear portions 12a and 12b include side portions 12c and 12d shaped to reside over the side windows 10b. The side portions 12c and 12d are draped over the sides of the vehicle 10 providing at least some coverage of the side windows 10b. In some instances, the cover 12 may be a custom fit to the vehicle 10 and cover all or nearly all of the side windows 10b.

Figure 4A:
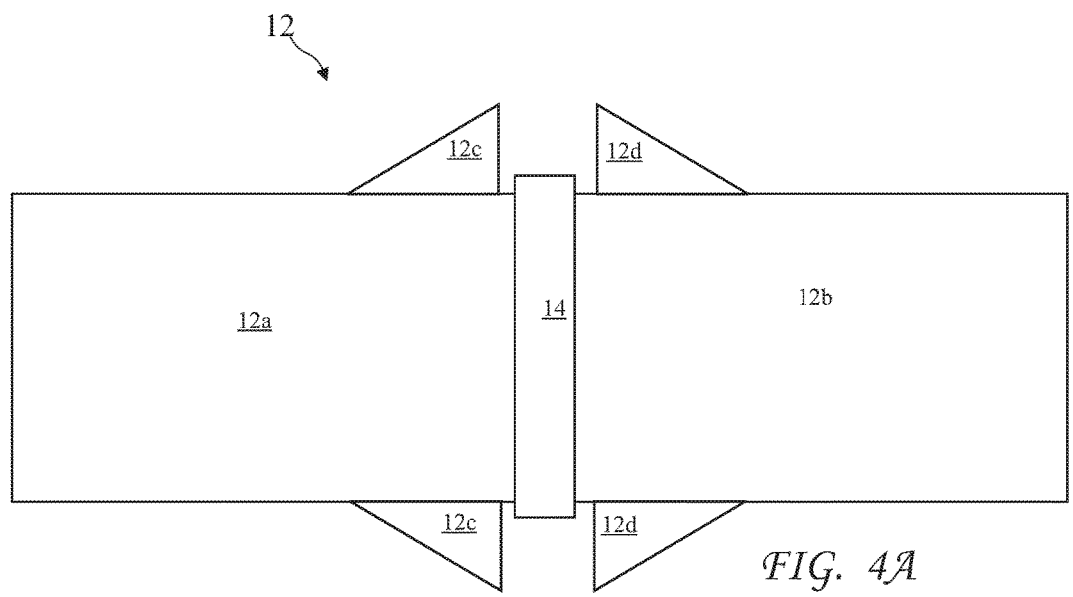
FIG. 4A shows the retractable cover with side window covers deployed according to the present invention.
Figure 4B:
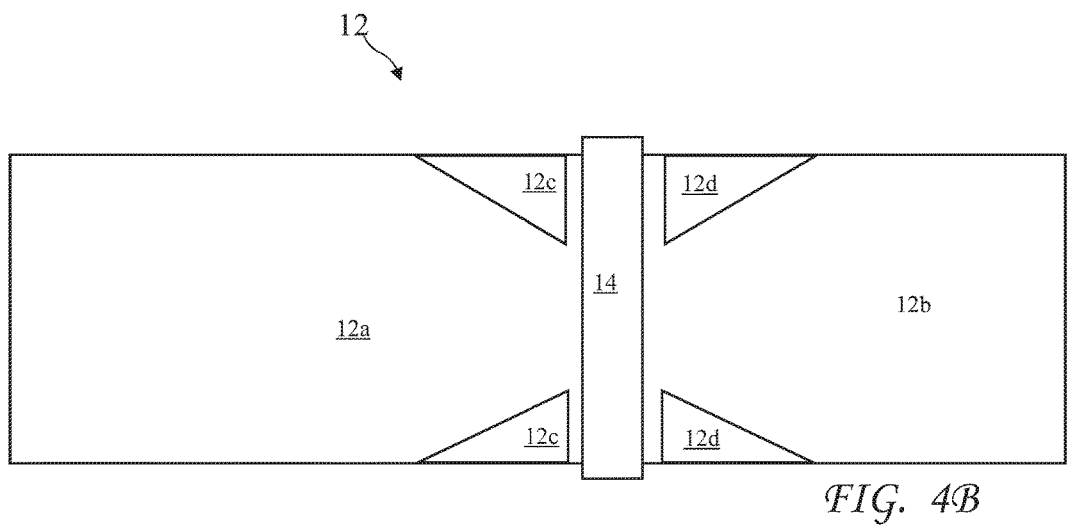
FIG. 4B shows the retractable cover with the side window covers folded according to the present invention.

The retractable cover 12 with side window covers 12c and 12d deployed is shown in FIG. 4A and the retractable cover 12 with the side window covers 12c folded is shown in FIG. 4B. The side window covers 12c are folded over the front and rear portions 12a and 12b for retracting in the housing 14.

Figure 5:
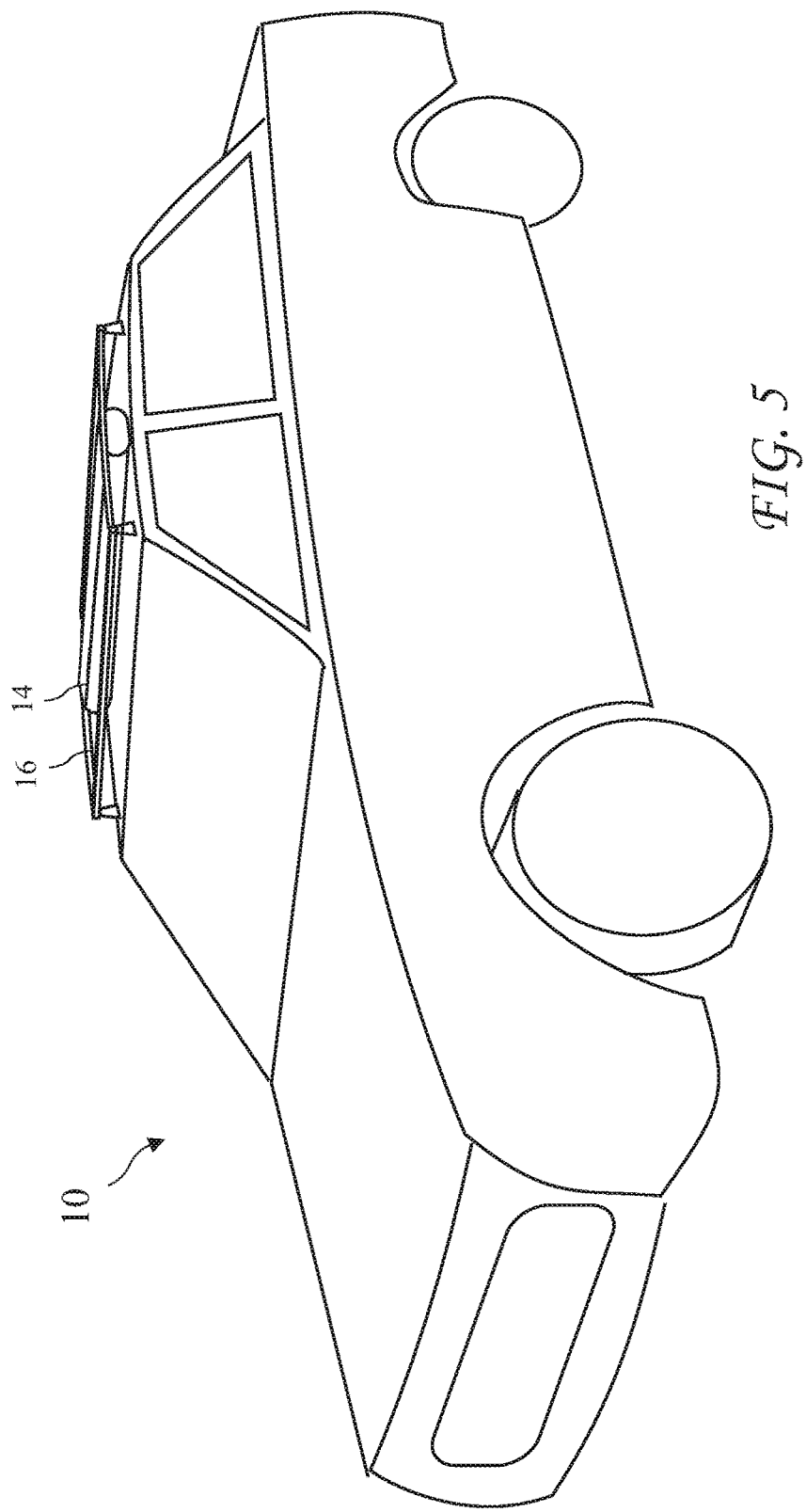
FIG. 5 shows the retractable cover according to the present invention combined with a roof rack.

An embodiment of the retractable cover 12 combined with a roof rack 16 is shown in FIG. 5. The roof rack 16 and housing 14 are mounted as a single unit to the vehicle 10 providing the utility of a roof rack and deployable cover in a single unit.

Figure 6:
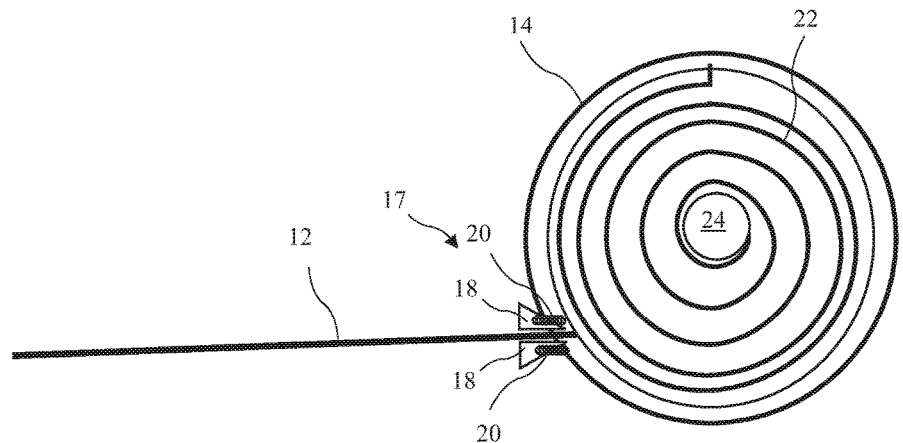
FIG. 6 shows a spiral retraction spring of the retractable cover according to the present invention.

A spiral retraction spring 22 of the retractable cover 12 is shown in FIG. 6. The spiral retraction spring 22 resides inside the housing 14, preferably at one end of a front and rear roller 24. The spiral retraction spring 22 is wound by extracting the covers 12a and 12b from the housing 14 and relaxes to rotate the roller 24 to retract the cover 12 into the housing 14. A locking mechanism 17 locks the covers 12a and 12b in the extracted position, and tugging on the covers 12a and 12b releases the locking mechanism 17 allowing a user to guide each cover 12a and 12b back into the housing 14. An example of a locking mechanism 17 comprises wedges 18 and springs 20 biasing the wedges into an unlocked position, and quickly releasing the cover 12a and 12b urges the wedges 18 together to lock the cover 12a and 12b in the deployed position. Those skilled in the art will recognize other locking mechanisms, and any retractable cover with a similarly functioning locking mechanism is intended to come within the scope of the present invention.

Figure 7A:
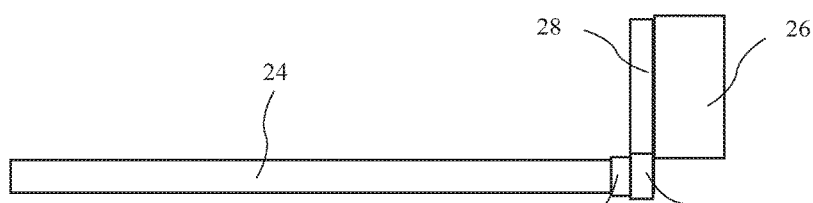
FIG. 7A shows a top view of a gear drive motor driven retractable cover according to the present invention.
Figure 7B:
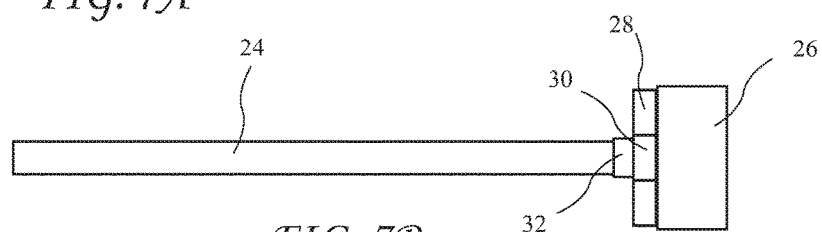
FIG. 7B shows a front view of a gear drive motor driven retractable cover according to the present invention.

A top view of a gear drive motor driven retractable cover is shown in FIG. 7A and a front view of a gear drive motor driven retractable cover is shown in FIG. 7B. A motor 26 drives the roller 24 to retract the covers 12 and 12b. The roller is driven through motor gear 28 and roller gear 30 to rotate the roller 24. A sprague (or one way clutch 32 may reside between the roller gear 30 and the roller 24 or between the motor gear 28 and the motor 26 to allow the covers 12a and 12b to be deployed without driving the motor 26. The motor 26 may be packaged in the housing 14 with the motor 26 retracting the front cover 12a offset to the rear, and the motor 26 retracting the rear cover 12b offset to the front, providing compact packaging. The motors 26 preferably include remote controls allowing a user to guide the covers 12a and 12b into the housing 14 while selectively powering the motor 26 retracting the front cover 12a, or selectively powering the motor 26 retracting the rear cover 12b.

Figure 8:
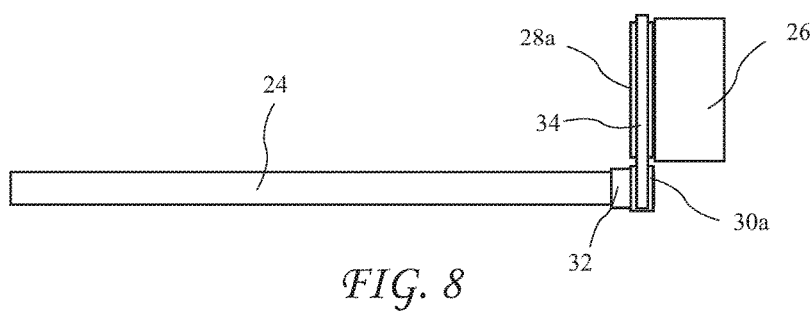
FIG. 8 shows a front view of a belt or chain drive motor driven retractable cover according to the present invention.

A front view of a belt or chain 34 drive motor driven retractable cover 12 is shown in FIG. 8. Other than coupling the motor 26 and roller 24 with the belt or chain 34 and pulleys or sprockets 28a and 30a, the belt or chain 34 drive motor driven retractable cover 12 is similar to the gear drive motor driven retractable cover 12. The rollers may alternatively be driven by the motors through planetary gears with or without the sprague clutches.

While the invention herein disclosed has been described by means of specific embodiments and applications thereof, numerous modifications and variations could be made thereto by those skilled in the art without departing from the scope of the invention set forth in the claims.

I claim:

1. A retractable car cover, comprising:
    a housing mountable to a vehicle roof;
    a front roller rotatably residing in the housing;
    a rear roller rotatably residing in the housing behind the front roller;
    a front cover portion rollable onto the front roller to reside in the housing in a front stowed position, and deployable from the housing; and
    a rear cover portion rollable onto the rear roller to reside in the housing in a rear stowed position and deployable from the housing;
    spiral springs residing inside the housing and attached to the front and rear rollers and configured to resist withdrawal of the front cover and the rear cover from the housing and to draw the front cover and the rear cover into the housing; and
    locking mechanisms configured to retain the front cover and the rear cover when deployed, and to release the front cover and the rear cover to return the front cover and the rear cover into the housing.

2. The retractable car cover of claim 1, wherein the front cover and the rear cover include side flaps foldable onto the front and rear covers for stowing in the housing and foldable from the front and rear covers to cover all or part of side windows of the vehicle and not extending substantially forward or rearward or below the side windows.

3. The retractable car cover of claim 1, wherein the locking mechanisms comprise:
    wedges attached to the housing on opposite sides of the front cover and the rear cover and tapering smaller into the housing; and
    springs biasing the wedges towards an unlocked position.

* * * * *